United States Patent Office 2,847,460
Patented Aug. 12, 1958

2,847,460

6-METHYL-3-CYCLOHEXENE-1-ACRYLIC ACID

Walter B. Trapp and Donald E. Pletcher, Midland, Mich., assignors to The Dow Chemical Company, Midland, Mich., a corporation of Delaware No Drawing. Application August 17, 1956
Serial No. 604,603

1 Claim. (Cl. 260—514)

This invention is concerned with 6-methyl-3-cyclohexene-1-acrylic acid compounds having the general formula

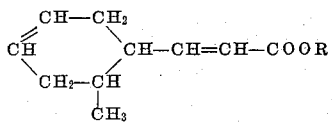

In this and succeeding formulae, R represents a member of the group consisting of hydrogen and a lower alkyl radical containing from 1 to 4 carbon atoms, inclusive.

The products of this invention are light colored liquids generally soluble in common organic solvents such as acetone, ethanol and xylene, and substantially insoluble in water. The compounds of this invention are useful as parasiticides, adapted to be employed as toxic constituents in compositions for the control of fungi and bacteria.

6-methyl-3-cyclohexene-1-acrylic acid having the general formula

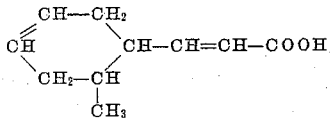

may be prepared by causing 6-methyl-3-cyclohexene-1-carboxaldehyde to react with malonic acid to produce the desired 6-methyl-3-cyclohexene-1-acrylic acid and water of reaction.

In the synthesis good results are obtained when substantially equimolar proportions of the reactants are employed. The reaction is carried out in the presence of a basic catalyst such as piperidine and trimethylamine and takes place smoothly in the temperature range of from 80° to 110° C. A solvent may be employed, if desired. Suitable solvents include pyridine, picoline and benzene.

In carrying out the reaction, malonic acid is dissolved in pyridine and 6-methyl-3-cyclohexene-1-carboxaldehyde and a few drops of piperidine added thereto. The resulting mixture is heated on the steam bath until the evolution of carbon dioxide has ceased, whereby the desired 6-methyl-3-cyclohexene-1-acrylic acid product is formed.

Following the reaction, the product may be isolated and purified by conventional methods. For example, the product may be isolated from the reaction mixture by (1) vaporizing off a major portion of the pyridine solvent, (2) adding aqueous alkali thereto to form a salt solution of the acids, (3) extracting the alkaline solution with a water-immiscible organic solvent to remove non-acidic organic constitutents, (4) acidifying the resulting alkaline solution to reform the free acids, (5) recovering the acids therefrom by extraction with a water-immiscible organic solvent and (6) removing the solvent by vaporization at atmospheric or reduced pressure. The product may then be purified by conventional procedures such as by fractional distillation.

The esters of 6-methyl-3-cyclohexene-1-acrylic acid having the general formula

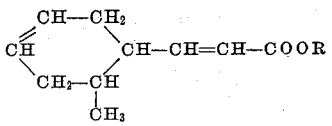

may be prepared by esterifying a 6-methyl-3-cyclohexene-1-acrylic acid with a lower aliphatic alcohol having the formula, ROH.

In carrying out the reaction, 6-methyl-3-cyclohexene-1-acrylic acid, an appropriate alcohol and catalyst are mixed together and heated for 7 to 20 hours to produce the desired ester and water of reaction. The latter may be removed from the reaction zone by the addition of a chemical agent to take up the water of hydration or by adding a suitable agent such as benzene to remove the water in an azeotropic mixture. The preferred catalysts are a mineral acid such as sulfuric acid or an acidic resin such as Dowex 50 resin (a sulfonated styrene-divinylbenzene copolymer). After completion of the reaction, the mixture is freed of catalyst by filtration or otherwise, the unreacted alcohol recovered by distillation, and the desired alkyl 6-methyl-3-cyclohexene-1-acrylate product obtained as residue. The latter may be purified by washing and fractional distillation, if desired.

The following examples illustrate the invention but are not to be construed as limiting.

*Example 1.—6-methyl-3-cyclohexene-1-acrylic acid*

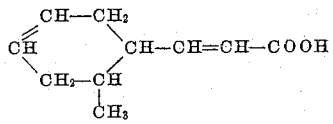

52 grams (0.5 mole) of malonic acid was dissolved in 75 grams of pyridine by heating to 50°–70° C. and 62 grams (0.5 mole) of 6-methyl-3-cyclohexene-1-carboxaldehyde and a few drops of piperidine added thereto. The resulting mixture was heated on the steam bath until the evolution of carbon dioxide ceased and the major portion of the pyridine had evaporated. The residue was treated with 10 percent sodium hydroxide solution and the resulting mixture then extracted with benzene to remove non-acidic material. The residual alkaline solution was acidified with dilute sulfuric acid and the crude acrylic acid product extracted therefrom with benzene. The extract was stripped of benzene and then fractionally distilled to obtain a 6-methyl-3-cyclohexene-1-acrylic acid product boiling at 130° C. at 1.7 millimeters pressure and having a refractive index, $n_D^{25°\ C.}$ of 1.505 and a neutral equivalent of 166.7. The theoretical value for the latter is 166.2.

*Example 2.—Methyl 6-methyl-3-cyclohexene-1-acrylate*

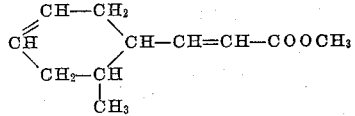

35 grams (0.21 mole) of 6-methyl-3-cyclohexene-1-acrylic acid, 100 milliliters of methanol, 1 gram of Dowex 50 resin and 15 grams of calcium chloride were mixed together and refluxed for 16 hours. At the end of the heating period, the reaction mixture was filtered to remove the resin and the filtrate partially distilled to strip out the remaining methanol. The oily residue was washed with water and then fractionally distilled to obtain a methyl 6-methyl-3-cyclohexene-1-acrylate product boiling at 75°–77° C. at 0.6 millimeter pressure. The latter had a refractive index, $n_D^{25°\,C.}$ of 1.486 and a saponification equivalent of 179.7. The theoretical value for the latter is 180.2.

*Example 3.—Isopropyl 6-methyl-3-cyclohexene-1-acrylate*

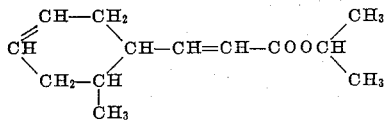

83 grams (0.5 mole) of 6-methyl-3-cyclohexene-1-acrylic acid, 300 milliliters of isopropanol, 10 drops of concentrated sulfuric acid and 50 milliliters of benzene are mixed together and heated to boiling temperature to produce the desired ester and water of reaction. The latter is allowed to distill out of the reaction zone as a benzene-water azeotrope. The heating is continued until the reaction is complete as evidenced by no further evolution of water of reaction. After completion of the heating, the mixture is allowed to cool, the pH adjusted to 7 with aqueous sodium hydroxide solution and the mixture heated to distill out excess isopropanol and to obtain an isopropyl 6-methyl-3-cyclohexene-1-acrylate product as residue. The product is purified by dissolving in benzene, filtering to remove sodium sulfate and then heating to distill off first the water and benzene and then to recover a purified isopropyl 6-methyl-3-cyclohexene-1-acrylate product having a molecular weight of 208.

*Example 4.—Normal-butyl 6-methyl-3-cyclohexene-1-acrylate*

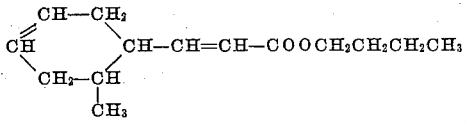

83 grams (0.5 mole) of 6-methyl-3-cyclohexene-1-acrylic acid, 300 milliliters of normal-butyl alcohol and 2 grams of Dowex 50 resin are mixed together and the mixture heated under reflux for 12 hours. After completion of the heating, the mixture is filtered to remove the resin and the filtrate fractionally distilled under reduced pressure to obtain a normal-butyl 6-methyl-3-cyclohexene-1-acrylate product having a molecular weight of 222.

The products of this invention are useful as perfume aromatics and adapted to be employed in compositions where introduction of artificial odor is desired. Further, these compounds are useful as parasiticides and are adapted to be employed as toxic constituents in bactericidal and fungicidal preparations. In a representative operation, 6-methyl-3-cyclohexene-1-acrylic acid was added to nutrient agar media to give a concentration of 0.5 percent, the media inoculated with *Staphylococcus aureus* and *Rhizopus nigricans,* and incubated at 30° C. for 4 days. At the end of this period complete inhibition of growth of the test organisms was observed.

The 6-methyl-3-cyclohexene-1-carboxaldehyde employed in this invention may be prepared by heating together under pressure butadiene and crotonaldehyde in the presence of a polymerization inhibitor such as 4-tertiarybutylcatechol until a pressure drop is noted. The reaction mixture may then be distilled to obtain the desired 6-methyl-3-cyclohexene-1-carboxaldehyde having a boiling point of 76° C. at 29 millimeters pressure and a refractive index, $n_D^{25°\,C.}$ of 1.465.

We claim:

6-methyl-3-cyclohexene-1-acrylic acid.

References Cited in the file of this patent

UNITED STATES PATENTS

| 2,363,501 | Coleman et al. | Nov. 28, 1944 |
| 2,517,708 | Pelton et al. | Aug. 8, 1950 |

OTHER REFERENCES

Arbuzov et al.: Chem. Abst., 32, 508 (1938).
Snyder et al.: J. Am. Chem. Soc., 72, 4098 (1950).